United States Patent [19]
Keuschnigg

[11] Patent Number: 5,236,587
[45] Date of Patent: Aug. 17, 1993

[54] PROCESS AND APPARATUS FOR THE SEPARATION OF MATERIALS FROM A MEDIUM

[76] Inventor: Josef Keuschnigg, Lormanberg 67, A-8324 Kirchberg (Steiermark), Austria

[21] Appl. No.: 780,083

[22] Filed: Oct. 17, 1991

Related U.S. Application Data

[63] Continuation-in-part of Ser. No. 524,962, May 18, 1990, abandoned.

[30] Foreign Application Priority Data

| May 18, 1989 | [AT] | Austria | 1200/89 |
| May 18, 1989 | [AT] | Austria | 1201/89 |
| Aug. 23, 1989 | [AT] | Austria | 1998/89 |

[51] Int. Cl.$^5$ .............................................. B01D 21/26
[52] U.S. Cl. ................................ 210/456; 210/512.1
[58] Field of Search ..................... 210/512.1, 788, 789, 210/456; 209/211

[56] References Cited

U.S. PATENT DOCUMENTS

| 2,098,608 | 11/1937 | Berges | 210/58 |
| 2,378,632 | 6/1945 | Hooker, Jr. et al. | 210/57 |
| 2,726,767 | 12/1955 | Rakowsky | 209/211 |
| 2,731,147 | 1/1956 | Krebs | 209/211 |
| 3,953,184 | 4/1976 | Stockford et al. | 55/485 |
| 4,420,314 | 12/1983 | Barron, Jr. | 55/436 |

FOREIGN PATENT DOCUMENTS

| 0207927 | 8/1990 | European Pat. Off. |
| 1828290 | 11/1960 | Fed. Rep. of Germany |
| 1279538 | 10/1968 | Fed. Rep. of Germany |
| 1289516 | 10/1969 | Fed. Rep. of Germany |
| 1938918 | 4/1971 | Fed. Rep. of Germany |
| 2512104 | 10/1975 | Fed. Rep. of Germany |
| 2647486 | 5/1977 | Fed. Rep. of Germany |
| 2832097 | 1/1980 | Fed. Rep. of Germany |
| 2038045 | 4/1981 | Fed. Rep. of Germany |
| 2945951 | 5/1981 | Fed. Rep. of Germany |
| 2720888 | 3/1984 | Fed. Rep. of Germany |
| 3615747 | 11/1987 | Fed. Rep. of Germany |
| 59-216646 | 12/1984 | Japan |
| 4830092/26 | 5/1990 | U.S.S.R. |
| 2137906 | 10/1984 | United Kingdom |
| 2177951 | 2/1987 | United Kingdom |
| WO83/01584 | 5/1983 | World Int. Prop. O. |

Primary Examiner—Frank Spear
Attorney, Agent, or Firm—Young & Thompson

[57] ABSTRACT

For the separation of at least one material from a liquid or gaseous medium, with a specific gravity different from the medium, the flowing mixture of material and medium is set into rotation about an axis oriented in parallel to its flow-off direction, the material is separated from the medium by centrifugal forces, and discharged separately from the purified medium. The velocity of the rotation of the mixture of material and medium is increased by an increasing reduction of the radius of the rotary movement. The medium is discharged from the device by means of mutually coaxially opposed dip pipes. An apparatus (10) for performing the process comprises a baffle (112) for producing the rotary motion of the introduced mixture in a separating chamber (113). The purified medium is withdrawn from the separating chamber (113) by way of mutually opposed dip pipes (114, 115), the cross section of which is smaller than that of the separating chamber (113). The separated material is discharged by way of a secondary cyclone (118) and a pipe (120).

14 Claims, 12 Drawing Sheets

PROCESS AND APPARATUS FOR THE SEPARATION OF MATERIALS FROM A MEDIUM

CROSS REFERENCE TO RELATED APPLICATION

The present invention is a continuation-in-part of my copending application Ser. No. 07/524,962 filed May 1 1990, now abandoned.

FIELD OF THE INVENTION

The invention relates to a process for the separation of at least one material from a liquid or gaseous medium by centrifugal forces, this material having a specific gravity different from that of the medium, in particular for the separation of materials of a higher specific gravity from a liquid or gaseous stream, wherein the flowing mixture of material and medium is set into rotation about an axis oriented in parallel to its flow direction and the rotating mixture of material and medium is introduced into a separating chamber, and wherein the material is discharged separately from the medium.

BACKGROUND OF THE INVENTION

So-called cyclones or, in general, centrifugal separators are utilized for the separation of solid or liquid materials from flowing gases or liquids. The conventional arrangements have the drawbacks that the high rotational speeds necessary for efficient separation can be attained only with great expenditure of energy, and that the conventional cyclones have a relatively large-sized structure.

DE-A-2,647,486 discloses a hydrocyclone wherein special steps are taken to achieve preclassifying of the suspension to be purified in the hydrocyclone as early as within the inlet duct. For this purpose, the provision is made, in detail, that the entering stream of the suspension is divided into several component streams which are not to be combined any more even at a later point in time (see, in particular, pages 10 and 11 of DE-A-2,647,486).

Furthermore, there is no additional acceleration of the rotary movement in the hydrocyclone according to DE-A-2,647,486, and a product discharge pipe and a dirt discharge means are included. The fact that the dirt discharge means tapers in the shape of a truncated cone is of no significance for the separating effect since separation takes place primarily in an annular chamber, the walls of which are designed to be of cylindrical shape.

The centrifugal dust separator known from DE-C-883,555 comprises a displacement member tapering in the flow direction, whereas the wall has a cylindrical shape so that here, again, there cannot be an acceleration of the rotary movement. Furthermore, clean air is withdrawn only unilaterally via a clean air pipe.

The remarks set forth in connection with DE-C-883,555 also apply with respect to DE-C-688,803 since also in this reference a displacement member tapering in the flow direction is arranged within cylindrical outer walls. Also in DE-C-688,803, the purified medium is withdrawn merely on one side. An acceleration of the rotary motion cannot be expected in the device according to DE-C-688,803 on account of the ribs which extend in the longitudinal direction.

An apparatus disclosed in French A-2,274,363 comprises a baffle member known in a similar form from the two German patents discussed farther above.

In British C-374,382, the actual separating chamber is of cylindrical design so that acceleration of the rotary movement with reduction in the radius of the rotary movement does not occur. In British C-374,382, the purified medium is not withdrawn in opposite directions from the separating chamber.

U.S. Pat. No. 4,420,314 shows a separator with a cylindrical separating chamber shown especially in FIG. 4, wherein the medium to be separated is to collect. The arrangement of guide vanes is known from U.S. Pat. No. 4,420,314. However, in the separator known from U.S. Pat. No. 4,420,314, there is no acceleration of the rotary movement, and withdrawal of the purified medium is not effected through mutually opposed outlet openings.

Centrifugal separators with dip pipes are known per se from DE-A-2,832,097; DE-A-2,945,951; and DE-A-3,615,747. None of these conventional arrangements provides that the crude gas (namely the mixture of material and medium) is conducted from the inlet into the separating chamber.

In these arrangement, rather, crude gas exits again directly downstream of the inlet, and only a small partial quantity of crude gas can evolve into an eddy in these systems; more than half of the mixture fails to enter the separating chamber directly.

A dust remover has been known from "Handbuch der Entstaubung" [Manual of Dust Removal], published in 1964 by the printing department of Maschinenfabrik BETH GmbH (see pages 94 and 95); this dust remover is also called "Van-Tongeren dust separator" (see loc. cit. FIG. 47). In the Van-Tongeren dust separator, the gases to be freed of dust are set into a rotational movement with an only weak radial component in a fluidizing chamber. The dust particles migrate to the wall of the fluidizing chamber where they are suctioned off together with a small partial gas stream and finally are precipitated in a cyclone having a correspondingly smaller diameter. The thus-cleaned gases exit from the fluidizing chamber after reversal of their direction of rotation through a cylindrically aligned baffle system; by the deflection movement, any relatively large particles that have been entrained are to be flung away toward the outside. This arrangement of a dust remover, although offering the advantage of a compact arrangement possibility since the fluidizing chamber can be accommodated, in case of removing dust from flue gases, in a flue that is needed anyway, does include the disadvantages that this structure can hardly meet any more sophisticated requirements than an individual cyclone having a correspondingly larger diameter.

SUMMARY OF THE INVENTION

The invention is based on the object of providing a process for centrifugal separation, i.e. especially for the separation of dust or other solids or of liquids from gases or liquids, quite generally for separating proportions of a higher specific gravity from a liquid or gaseous medium, wherein the material and the medium are essentially immiscible or mutually insoluble, which process can be performed with low expenditure of energy and with a higher degree of separation.

This object has been attained, in accordance with this invention, by accelerating the rotary movement of the mixture of material and medium during feeding to the separating chamber, with a reduction of the radius of the rotary movement of the mixture; and by discharging the medium through mutually coaxially opposed outlet openings. This is achieved without the necessity for an additional drive mechanism, in whatever form.

In conventional cyclones, the volume stream to be cleaned per unit time is limited by the cross section of the discharge pipe for the purified medium. By the arrangement of a second pipe, the throughput through the separating device can be substantially increased whereby also higher rotational speeds and thus superproportionally higher centrifugal forces of the medium to be purified and consequently a higher degree of separation with increased throughput are attained.

A high degree of separation is obtained on account of the provision, according to this invention, that the mixture of material and medium is set into rotation and, with reduction of the radius of the rotary movement for accelerating the rotary movement of material and medium, is discharged through a cross section, the radius or cross section of which is smaller than the inner radius or cross section of the chamber wherein the mixture is set into rotation. Since with a free eddy the angular velocity increases, on account of the principle of conservation of energy, with a decreasing radius of the rotary motion, it is possible when using the process of this invention to attain high separation efficacies and degrees of separation without great expenditure and without high blower outputs; this is so because radial accelerations of up to 1600 g can be obtained. Moreover, in the process of this invention, the losses are lower and range at approximately one-half of the losses occurring in conventional cyclones.

With a free eddy, a higher rotational speed evolves in correspondence with the higher mass throughput if, in the same space, a higher meass stream is put through.

An apparatus especially suited for performing the process of this invention, with a housing containing devices for producing the rotary movement of the mixture of material and medium about an axis in parallel to its flow direction in a space extending about the axis of the rotary movement of the mixture, and with a separating chamber wherein outlet openings are provided for the purified medium and for the separated material, is characterized in that, for discharging the purified medium, two mutually coaxially opposed openings are provided.

A reduction of the radius of the rotary motion can be attained in an especially simple way by providing a guide means for the formation of the space extending around the axis for producing the rotary movement, wherein the effective radius of the guide means, as seen in the axial direction, at the exit of the medium to be purified from the space for producing the rotary movement extending around the axis is larger than the effective radius of the openings (dip pipes) through which the purified medium exits from the separating chamber.

The principle according to this invention can be realized in an especially simple way also in conventional cyclones by installing in the zone of the inlet a restrictor or some other installation element, forcing the mixture of material and medium to be separated to flow through a radially outward space extending around the longitudinal axis, the mixture being simultaneously set into rotation by guide vanes, the purified medium (gas or liquid) then flowing off via the dip pipe which has a smaller cross section than the cross section of the restrictor or of the other installation element so that the desired reduction of the radius of the rotary movement is achieved.

In an advantageous embodiment of an apparatus for performing the process of this invention, the provision is made that the openings terminating into the separating chamber are dip pipes which extend into the separating chamber.

The dependent claims relate to advantageous further developments of the invention.

BRIEF DESCRIPTION OF THE DRAWINGS

Additional features, details and advantages of the invention can be seen from the embodiments schematically illustrated in the drawings wherein.

DETAILED DESCRIPTION OF THE INVENTION

Figure 1:
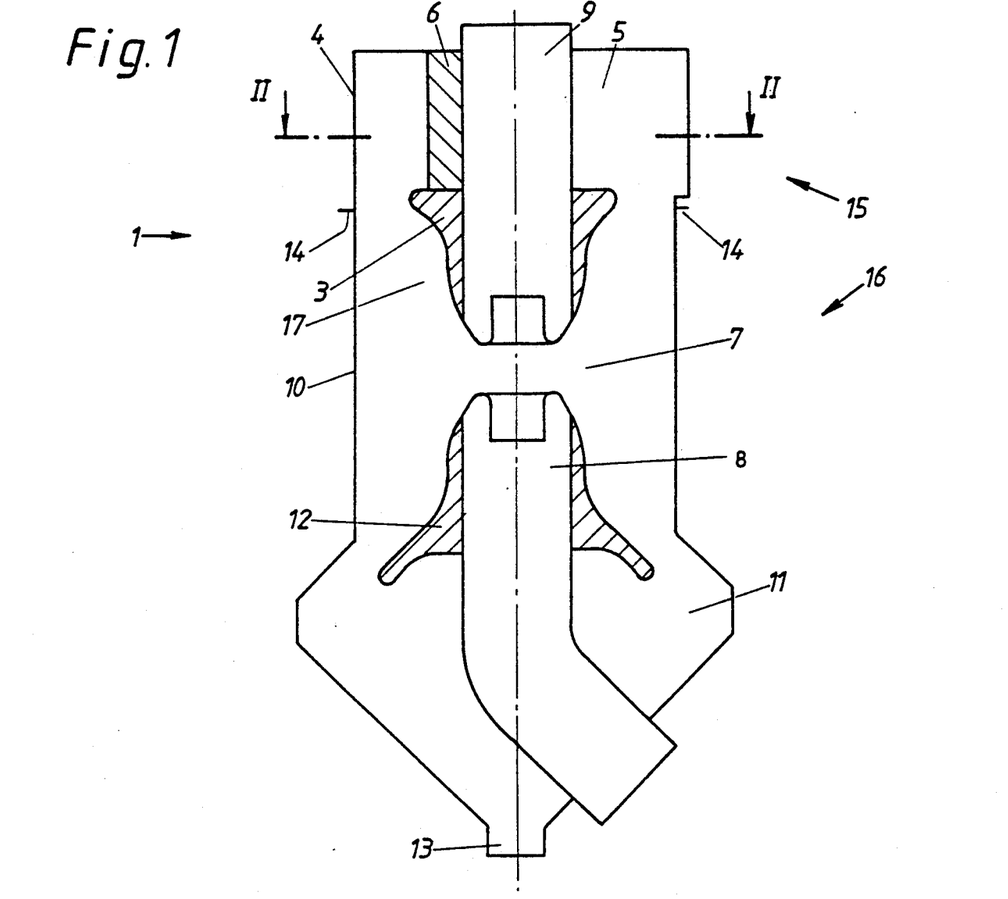
FIG. 1 is a sectional view of a separating device exposed to a tangential oncoming flow.
Figure 2:
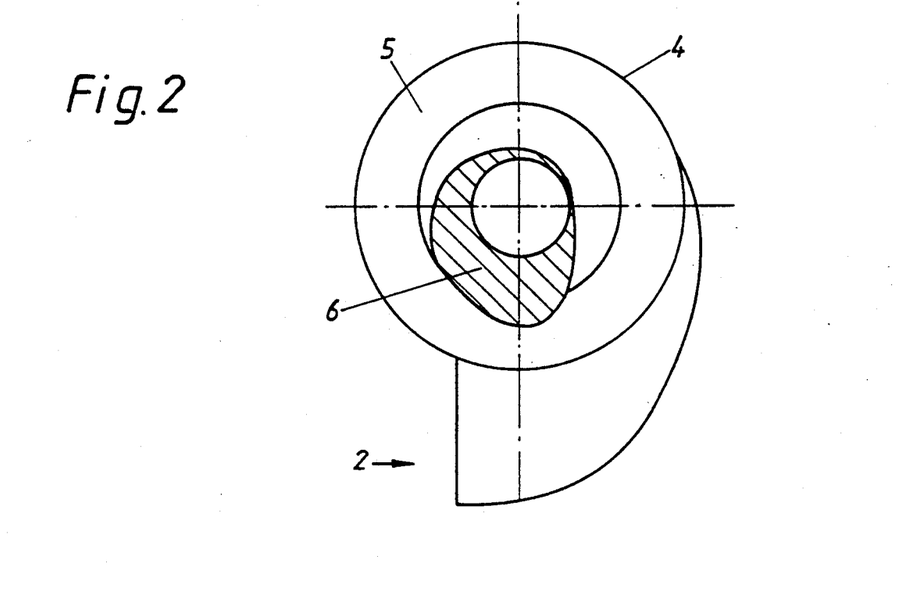
FIG. 2 is a section through the separating device of FIG. 1 along line II—II.

A separating device 1 illustrated in FIGS. 1 and 2 is exposed to a tangential oncoming flow of a mixture of material and medium to be separated through a pipe 2. The mixture of material and medium to be cleaned is set into rotation in a spiral-shaped space 5 formed between a baffle member 6 and an outer wall 4. The mixture, set into rotation, passes through an annular space 17 formed between the outer wall 4 and a guide means 3, designed so that it enhances flow dynamics, into the collection space (separating chamber 7).

Two dip pipes 8 and 9 discharging the purified medium extend into the separating chamber 7.

The two dip pipes 8 and 9 are arranged coaxially with respect to each other, and the diameter of the dip pipes 8 and 9 is smaller than the diameter of the guide means 3 at the transition from the spiral-shaped space 5 into the collection space 7, whereby the radius of the rotary motion of the mixture of material and medium to be purified is reduced and its revolving motion is accelerated. The upper dip pipe 9 is extended through the baffle member 6, the spiral-shaped space 5, and through the guide means 3.

In the collection space 7, the materials of higher specific gravity (or the material of higher specific gravity) are (or is) flung outwards against the wall 10 of the collecting space 7 and drop (or drops) into a stilling chamber 11. Upon entrance of the medium to be purified into the dip pipes 8 and 9, the radius of rotation is decreased whereby the thus-occurring centrifugal forces are even more enhanced.

At the lower dip pipe 8, a baffle means 12 (apical cone) is arranged for preventing material already separated from the medium from being transported upwards again due to creep flow from the stilling chamber 11 into the collection space 7. In the lower zone of the stilling chamber 11, a conduit 13 is provided for discharging the separated material(s).

In order to design the stilling of the medium to be cleaned and of the separated materials as efficiently as possible in the stilling chamber 11, the stilling chamber 11 is fashioned with a maximally large outer diameter.

The lower dip pipe 8 is extended through the stilling chamber 11 to the outside.

The separating device 1 of FIG. 1 consists of a top part 15 and a bottom part 16, connected with each other by means of a flange connection 14. Thereby, top parts and bottom parts of any desired configuration can be joined together.

Figure 3:
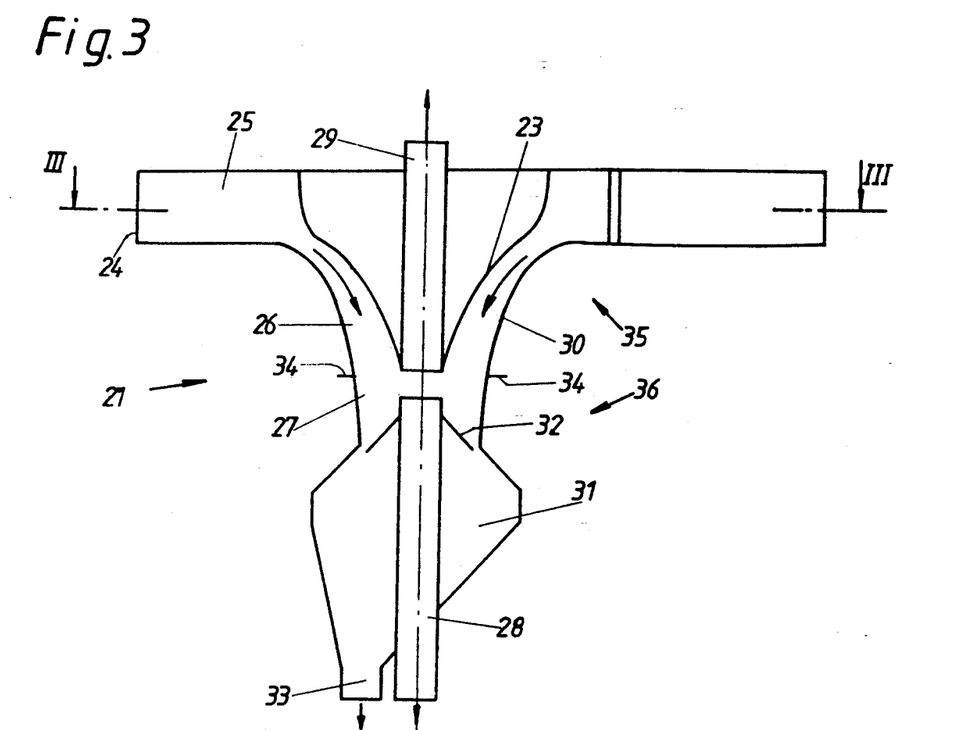
FIG. 3 shows another embodiment of a separating device with tangential oncoming flow, in a sectional view.
Figure 4:
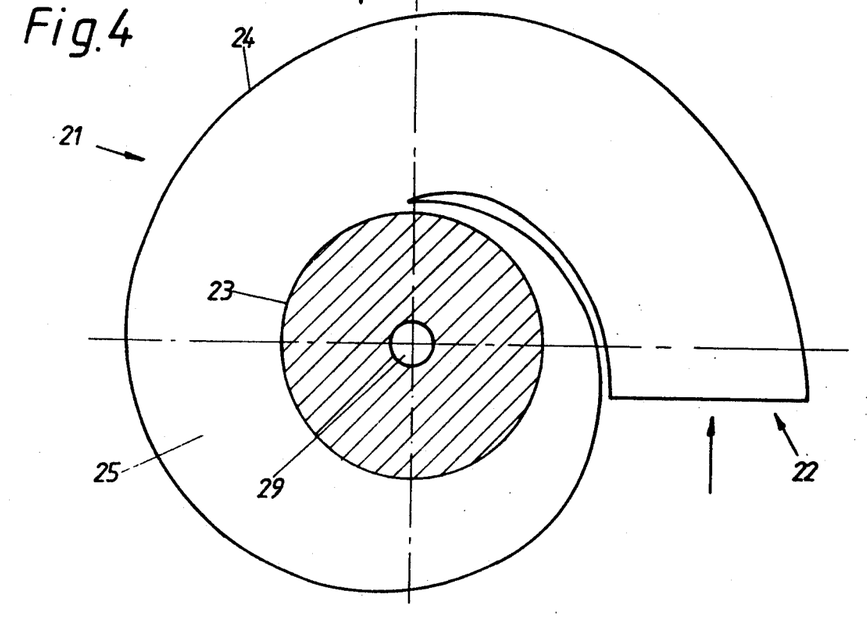
FIG. 4 is a section through the separating device of FIG. 3 along line III—III.

In the embodiment of a separating device 21 according to this invention illustrated in FIGS. 3 and 4, the mixture of material to be separated and medium to be cleaned is fed through an approximately spiral-shaped influx duct 22. The mixture then flows through an annular space 26 formed between an inner guide means 23 and an outer housing wall 30 to the collection chamber 27. The inner diameter, determined by the guide means 23, and the outer diameter, defined by the housing wall 30, of this annular space 26 decrease in the flow direction. The radius of the rotary movement of the mixture of material and medium thus decreases constantly during the movement from the spiral-shaped oncoming flow duct 22 to the separating chamber 27, whereby the angular speed of the rotary motion is increased.

The dip pipe 29, extended through the inner guide means 23, and the dip pipe 28, located coaxially in opposition to the dip pipe 29, project into the separating chamber 27. In the zone of the separating chamber 27, a baffle 32 is arranged at the dip pipe 28 preventing material separated from the medium from being again transported upwards from the stilling chamber 31 by creep flow. The separated material is removed via a pipe 33.

A top part 35 and a bottom part 36 of the separating device 21 are joined by means of a flange 34 so that a simple exchange of the top part 35 or bottom part 36 is made possible.

Figure 5:
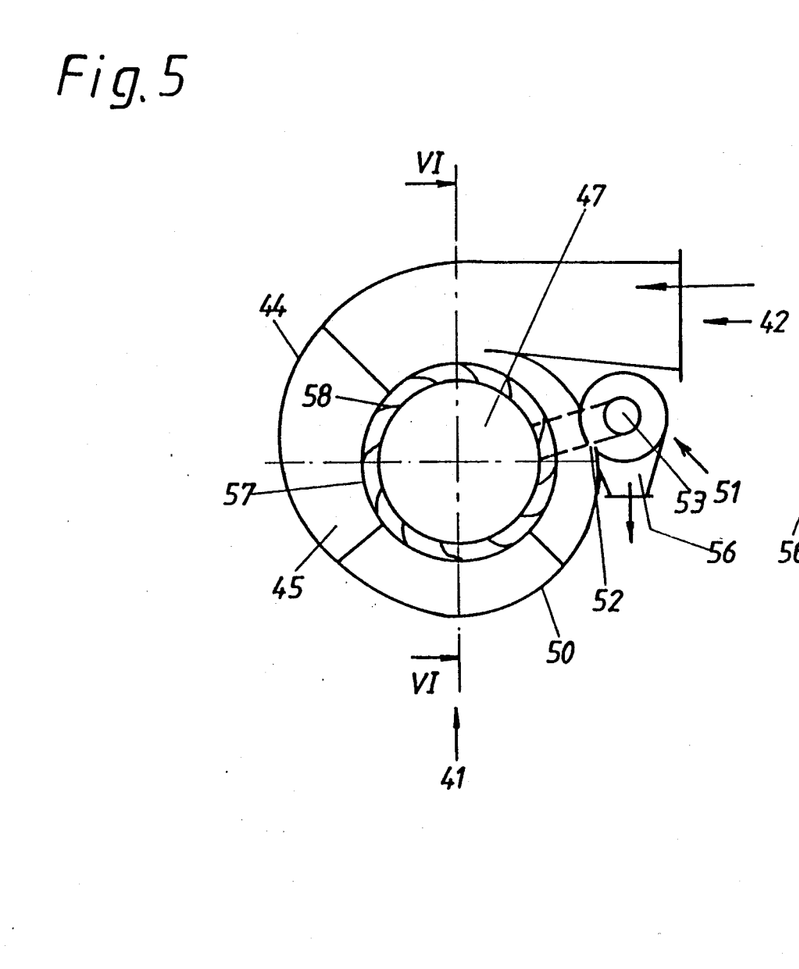
FIG. 5 is an embodiment of a separating device exposed to tangential oncoming flow, with a secondary cyclone.
Figure 6:
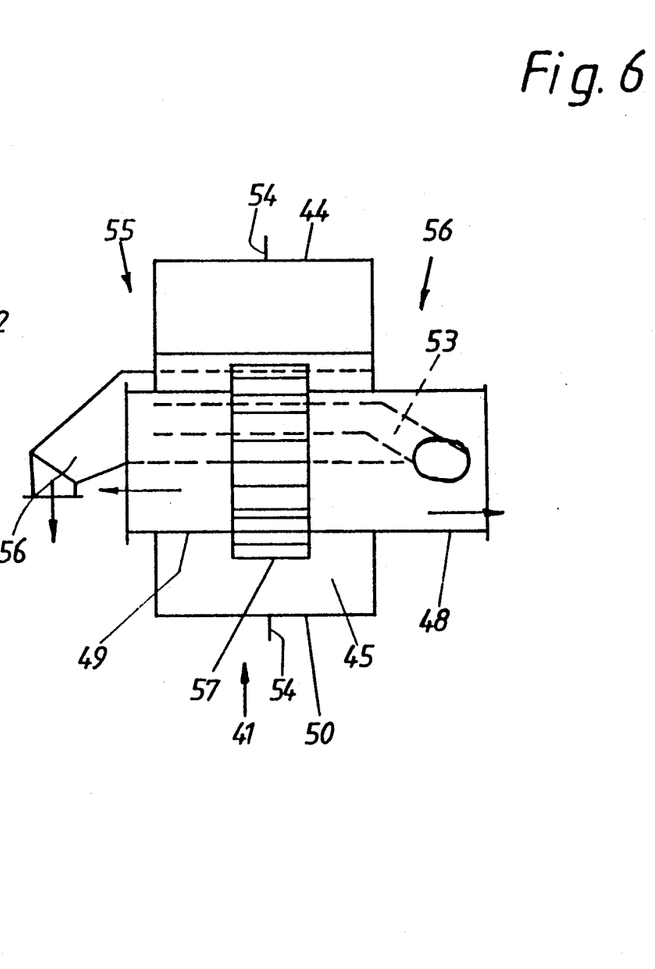
FIG. 6 is a section through the separating device of FIG. 5 along line VI—VI.

In FIGS. 5 and 6, an embodiment of a separating device 41 is illustrated with a secondary cyclone 51. The mixture of material to be separated and medium to be cleaned is fed tangentially through an oncoming flow duct 42, and the mixture is set during this step into rotation in space 45 and segregated, the material of higher specific gravity collecting on the outer wall and exiting with a small proportion of the medium (partial gas stream) via the slot 52 from the separating chamber. The space 45 is separated from the space 47 of the separating device 41 by means of a baffle element 57 with baffle plates 58. Two mutually coaxially opposed dip pipes 48 and 49 extend into the space 47, the purified medium being discharged through these pipes.

The secondary cyclone 51 is arranged on the housing wall 50 defining the space 45; this secondary cyclone is connected to the separating device 41 via a slot 52 extending over the entire height of space 45.

On account of the rotary motion of the mixture of material and medium in space 45, the material(s) of higher specific gravity is or are flung against the housing wall 50 on which they move further along in the direction of rotation until they enter through the slot 52 into the secondary cyclone 51 with a small proportion of medium still to be purified. A further separation of medium to be purified and material(s) of higher specific gravity takes place in the secondary cyclone 51, the purified medium being conducted away through a dip pipe 53 into the dip pipe 48. The thus-separated material(s) is (are) discharged via a pipe 56.

In space 47 between the dip pipes 48 and 49, a baffle means 57 with baffle plates 58 is arranged and attached to both dip pipes 48 and 49. The baffle plates 58 are of such a shape and arrangement that they affect the flow of the medium from space 45 and separating chamber 47 into the dip pipes 48 and 49 in such a way that the degree of separation is still further increased.

The separating device 41—as is also possible in the other embodiments of this invention—is subdivided into two joined parts 55 and 56, permitting a simple exchange of one or the other part 55 or 56, but also a retrofitting of the separating devices by means of an additional, second dip pipe.

Figure 7:
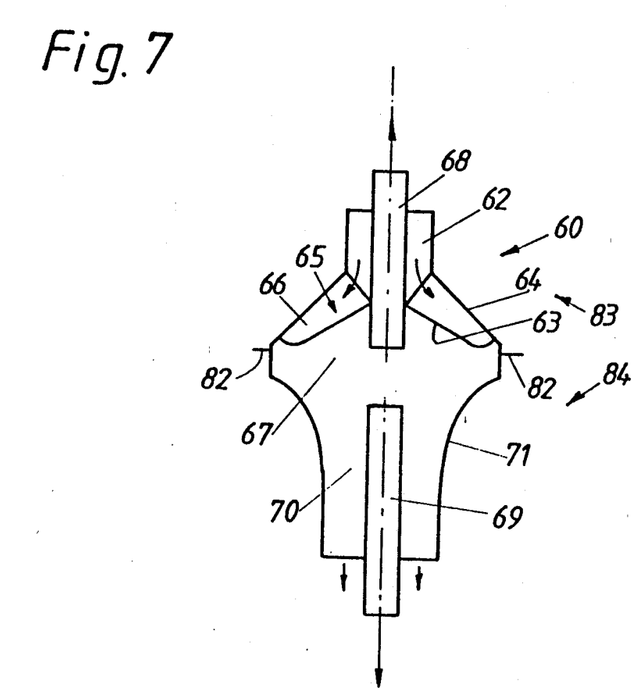
FIGS. 7 and 8 show two embodiments of separating devices exposed to an approximately axial oncoming flow.

In a separating device 60 shown in FIG. 7, the mixture of material and medium is introduced by way of a pipe 62 and set into rotation between a baffle means 63 and an outer wall 64 in an annular space 65 by means of guide vanes 66. In the collection chamber 67, the materials to be separated are segregated from the medium, and the medium is subsequently discharged axially through dip pipes 68 and 69 lying in mutually opposite coaxial position. The dip pipe 68 is arranged coaxially with respect to the pipe 62 through which the mixture is introduced.

The separated material is discharged via a space 70 between the dip pipe 69 and a downwardly tapering, outer housing wall 71.

Figure 8:
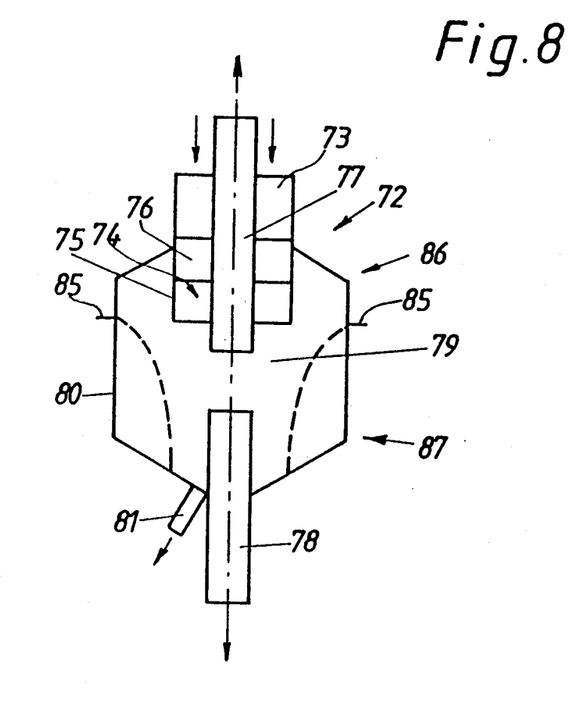

In FIG. 8, a separating device 72 is illustrated wherein the mixture of material to be separated and medium to be cleaned is fed by way of a pipe 73. In the pipe 73, a dip pipe 77 is coaxially arranged, and a dip pipe 78 is located in coaxial opposition to this dip pipe 77. The medium is removed from the separating device 72 through the dip pipes 77 and 78. An annular space 74 is formed between the dip pipe 77 and the pipe wall 75; in this space, the mixture of material to be separated and medium to be purified is set into rotation by means of guide vanes 76.

The collection space (separating chamber) 79 is disposed between the pipe 73 and, respectively, the dip pipe 77 and the dip pipe 78. The separating chamber 79 is defined toward the outside by a wall 80. The outer housing wall 80 can exhibit a cross-sectional configuration favorable from the viewpoint of fluidics, tapering in the efflux direction, as indicated by the dashed lines.

The separated material is discharged via a pipe 81.

The separating device 60 (FIG. 7) can have a top part 83 and a bottom part 84, joined by means of a flange 82, and the separating device 72 (FIG. 8) can have a top part and bottom part 86 and 87 connected via a flange 85.

The secondary cyclone 51 can also be provided at the separating devices 1, 21, 60 and 72, illustrated in FIGS. 1–4, 7 and 8; in case of the separating devices shown in FIGS. 1–4, this cyclone can be preferably arranged at the stilling chamber 11, 31.

Figures 9, 10:
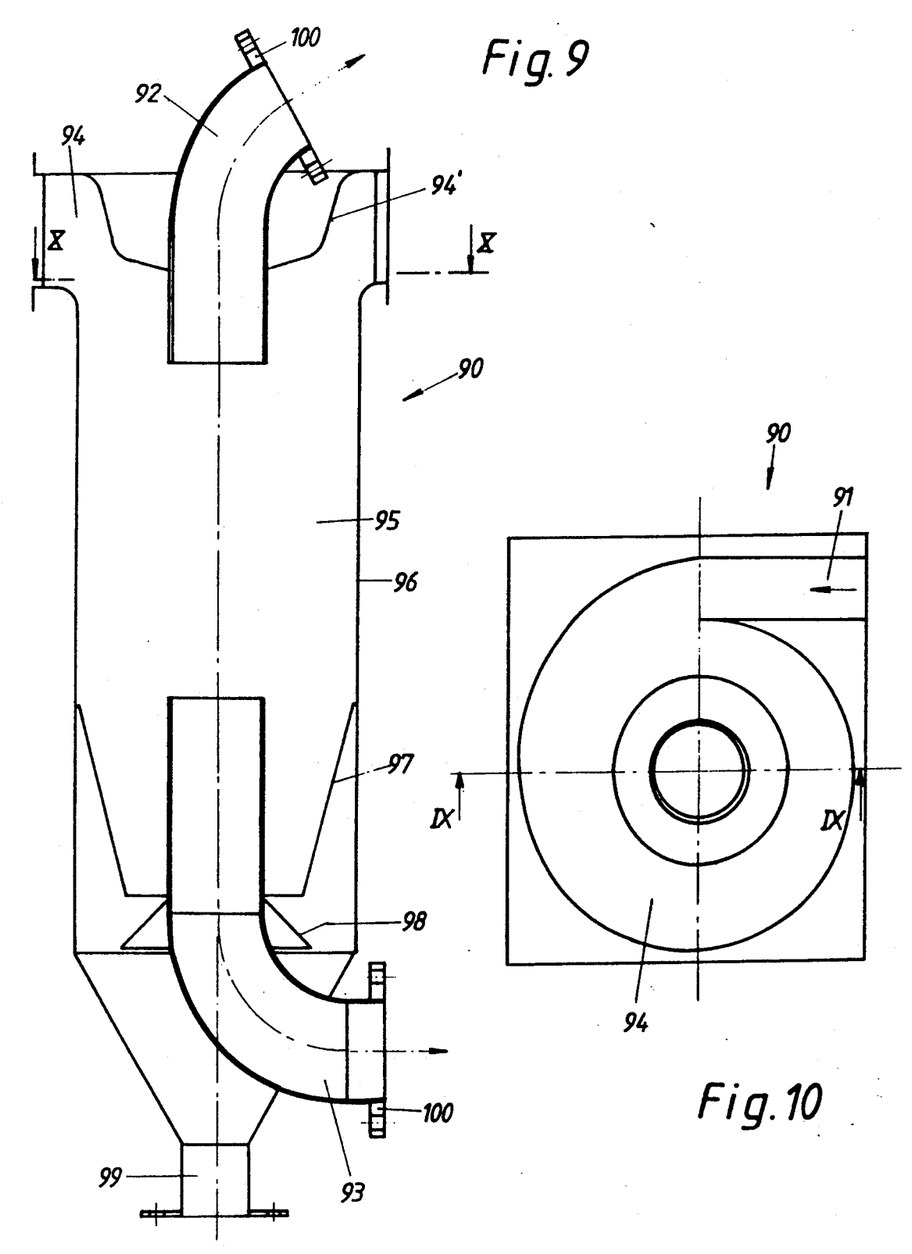
FIG. 9 is a section through a separating device with tangential oncoming flow along line IX—IX in FIG. 10.
FIG. 10 is a section along line X—X through the separating device of FIG. 9.

In a separating device 90 shown in FIGS. 9 and 10, the mixture of material to be separated and medium to be cleaned is introduced via an approximately spiral-shaped duct 91. The spiral-shaped duct 91 extends around the upper (92) of two mutually coaxially opposed dip pipes 92 and 93. The mixture to be separated is set into rotation in the space 94 formed by the approximately spiral-shaped duct 91, and flows into the collection chamber 95 from where the purified medium is discharged via the dip pipes 92 and 93. The separated material or the separated materials drops (drop) downwardly along the separating chamber wall 96.

Figure 11:
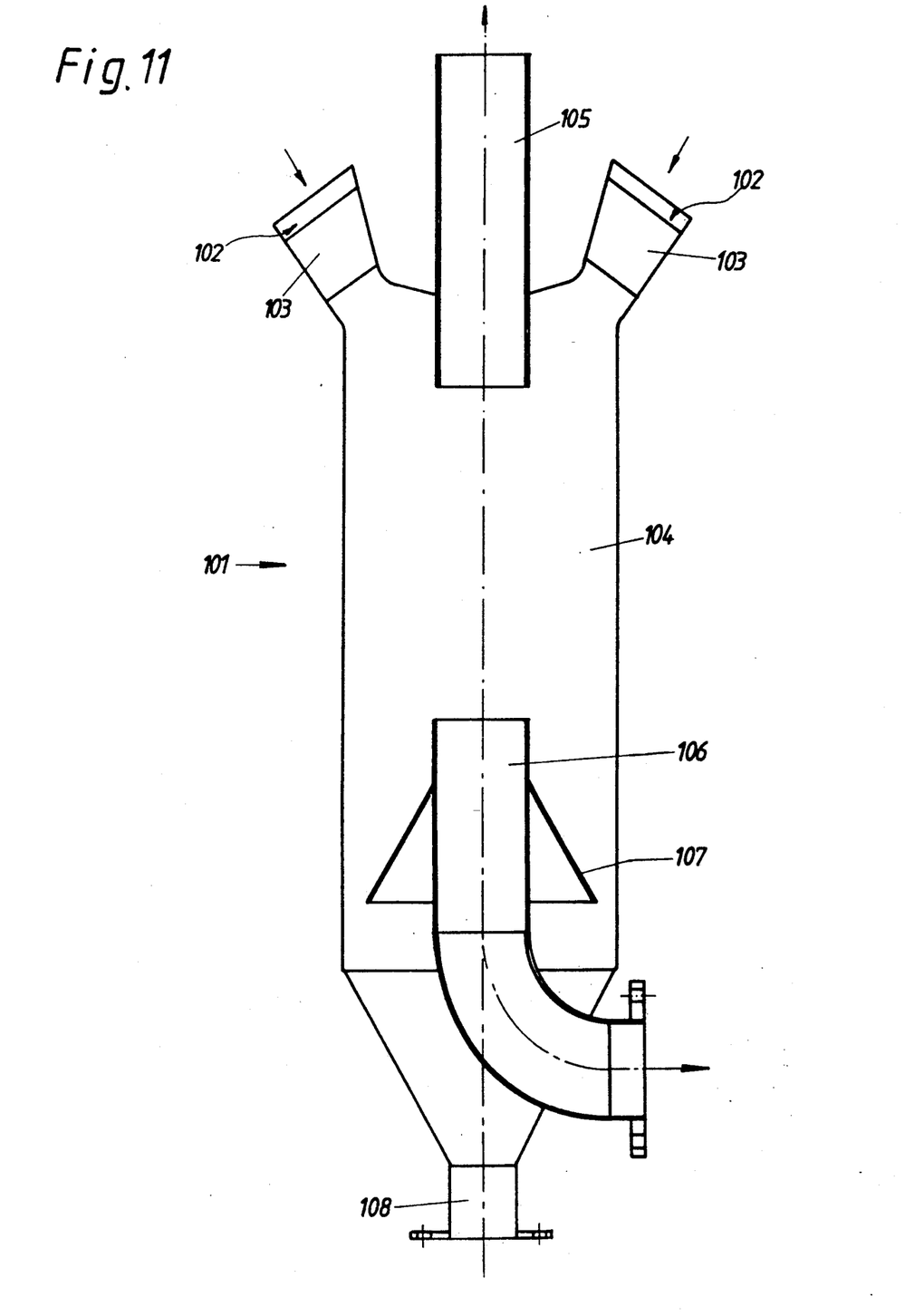
FIG. 11 is another embodiment of a separating device.
Figures 14, 15:
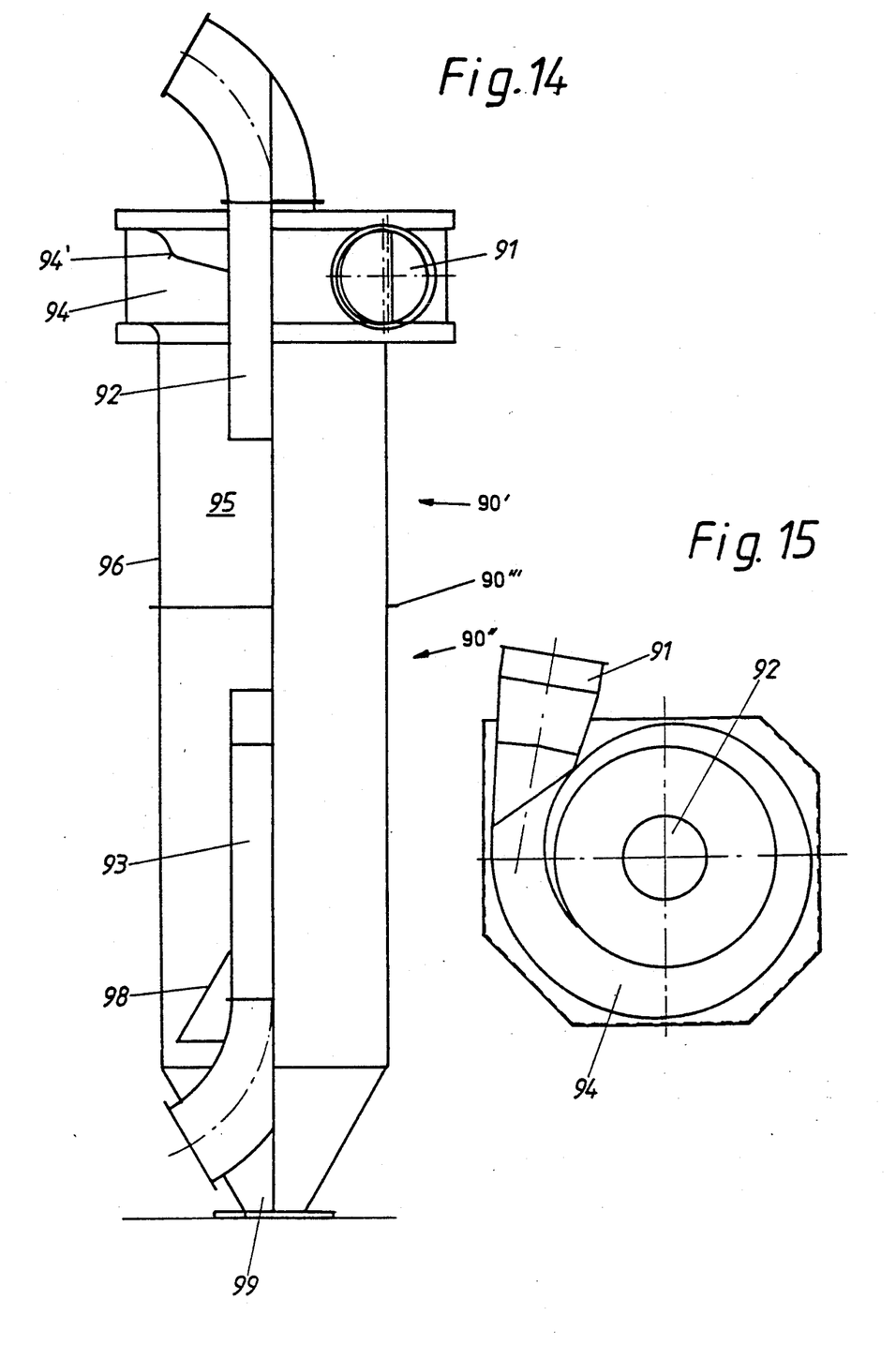

The separated material continues to drop along a downwardly tapering funnel 97 adjoined by a baffle means 98 connected to the dip pipe 93 and conically flaring in the downward direction. An arrangement without a funnel 97 is likewise possible wherein then the baffle means 98—in a similar fashion as shown in FIG. 11—extends to just in front of the housing wall. This device prevents already separated material from being sucked upwards again into the separating chamber 95. The separated material is subsequently discharged in the downward direction through a pipe 99. Such an embodiment is shown in FIGS. 14 and 15. FIG. 14 illustrates also that the dip pipes 92 and 93 extend at different distances into the separating chamber 95. In FIG. 9 as well as in the embodiment shown in FIG. 14, the baffle surface 94' can be omitted.

The dip pipes 92 and 93 are designed in this embodiment to be of a curved shape outside of the separating chamber and exhibit on their outer ends flanges 100 for attachment to other components.

FIG. 11 illustrates an embodiment of a separating device 101 likewise exhibiting two mutually coaxial dip pipes 105 and 106 projecting into a separating chamber 104. The mixture is fed in this example through a duct 102 having the shape of a conical ring, or through a disk-shaped space extending around the dip pipe 105. Baffles 103 are arranged in the duct 102, by means of which the inflowing mixture is set into rotation.

The lower dip pipe 106 includes a guide means 107 preventing the upward flow of already separated material. The lower dip pipe 106 is curved underneath the baffle means 107 and is extended toward the outside. The separated material is discharged from the separating device 101 via a pipe 108.

Figures 12, 13:
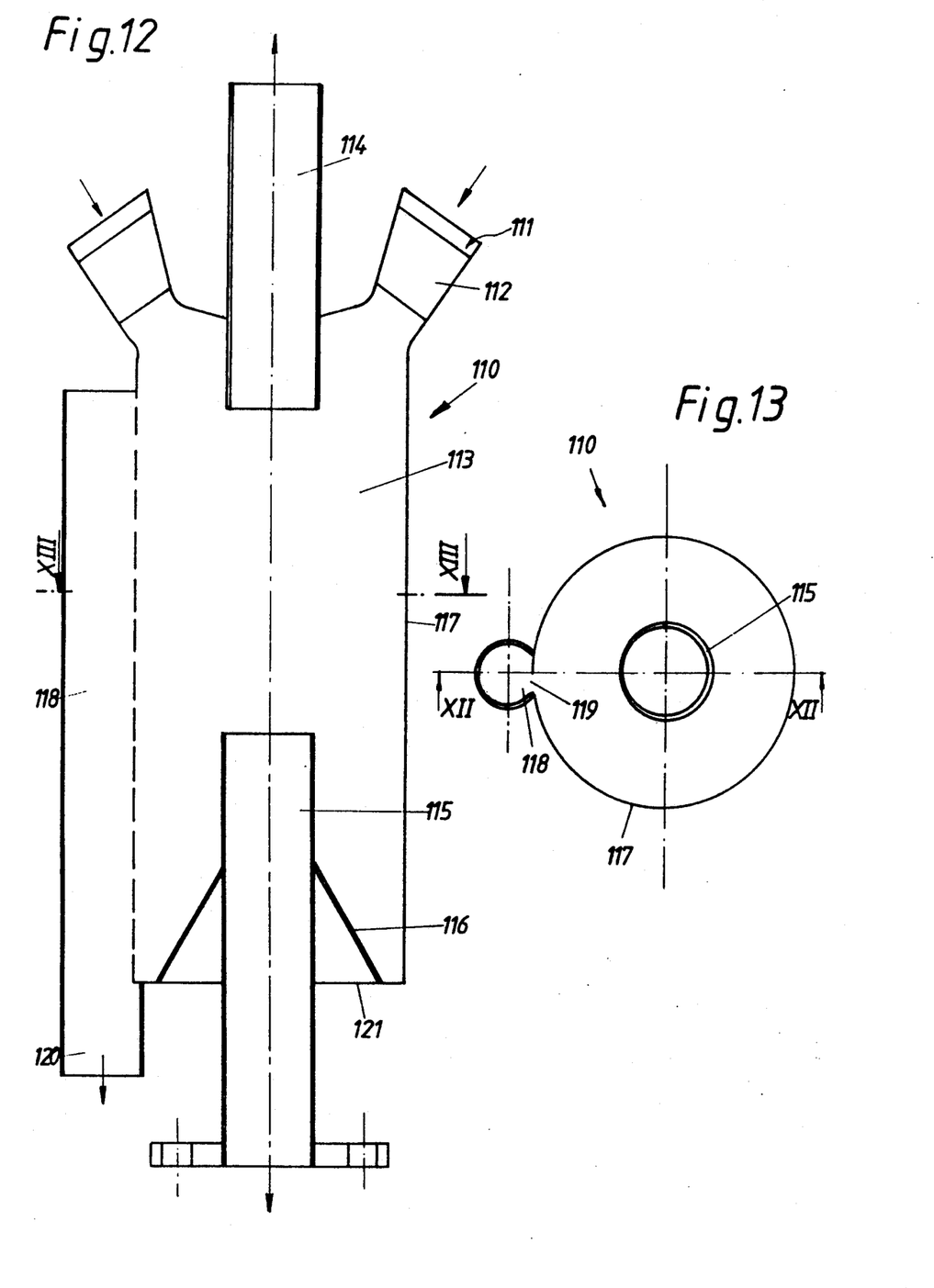
FIG. 12 is a section through the separating device of FIG. 13 along line XII—XII.
FIG. 13 is a section through the separating device along line XIII—XIII in FIG. 12, FIGS. 14 and 15 show an embodiment similar to FIGS. 9 and 10, FIGS. 16 and 17 show a practical embodiment of the top part of a separating device which can be easily manufactured.

In the separating device 110 shown in FIGS. 12 and 13, similarly as in the separating device 101 shown in FIG. 11, the mixture to be separated is fed via a duct 111 having the shape of a conical ring (or via a disk-shaped space), set into rotation by vanes 112, and the purified medium is discharged from the separating chamber 113 by mutually coaxially opposed dip pipes 114 and 115.

The outer wall 117 of the separating chamber 113 has a slot 119, by way of which the separating chamber 113 is connected to a pipe 118 extending in parallel to the separating chamber 113. The separated material or the separated materials is or are conducted through the slot 119 into the pipe 118 and discharged at the lower end 120 of the pipe 118.

The pipe 118 can be designed as a secondary cyclone whereby the degree of separation of the separating device 110 can be still further increased.

A downwardly flaring, conical baffle means 116 can be provided at the lower end of the separating chamber 113, the upper end of this baffle means being connected to the dip pipe 115 and the lower end of this baffle means being connected with the bottom 121 of the separating device 110. This baffle means 116 can prevent accumulation in the corner zone between the bottom 121 of the separating device 110 and the dip pipe 115.

In all of the described embodiments, a baffle means can be arranged between the dip pipes in the separating chamber, as already described in FIGS. 5 and 6. By means of such installations, pressure losses and velocity peaks of the medium can be avoided. In this connection, the provision can also be made that the two mutually opposed dip pipes are combined into a single pipe fashioned to extend continuously; in this case, the purified medium can enter through linear or helical slots into the interior of the conjoined dip pipes, and can flow off through these dip pipes into opposite directions.

Figure 16:
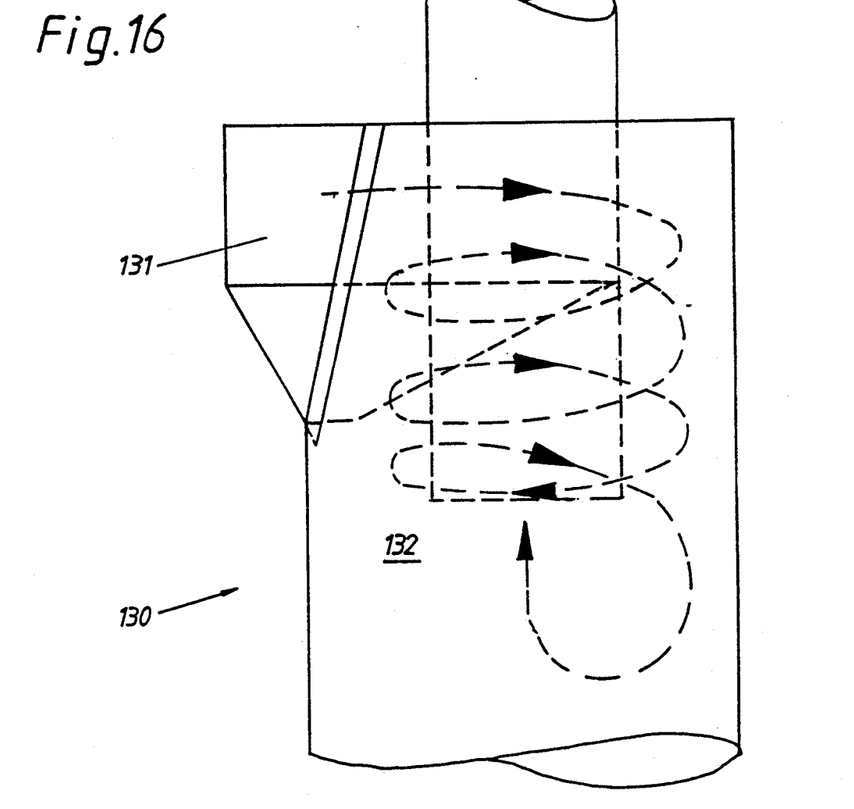
Figure 17:
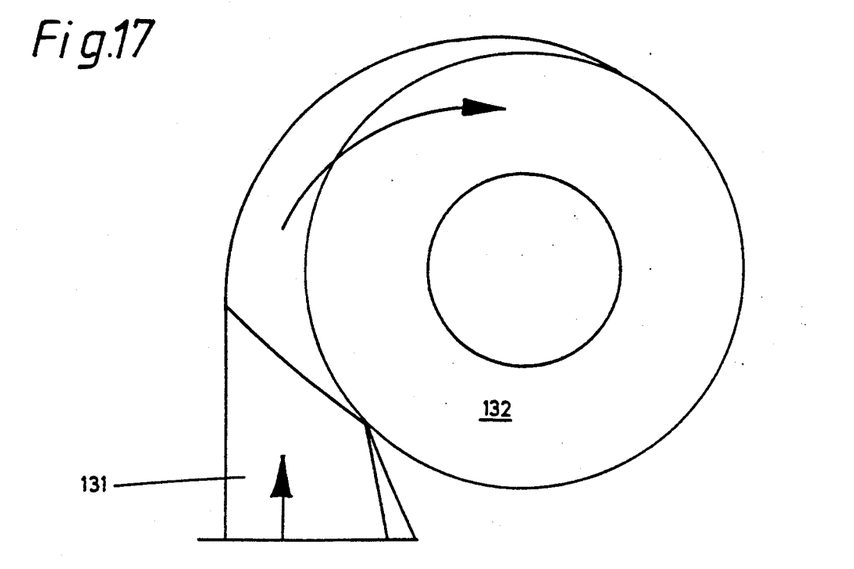

FIGS. 16 and 17 show in a plan view and, respectively, top view (with the top cover being imagined to be transparent) a practical embodiment of the top part of a separating device 130 according to this invention. The spiral-shaped duct 131, through which the mixture to be separated is introduced, is formed from cut-to-size sheet metal panels curved in each case only in one direction. Yet, a fluid-dynamically favorable transition results from the edge 131 into the separating chamber 132.

Figure 18:
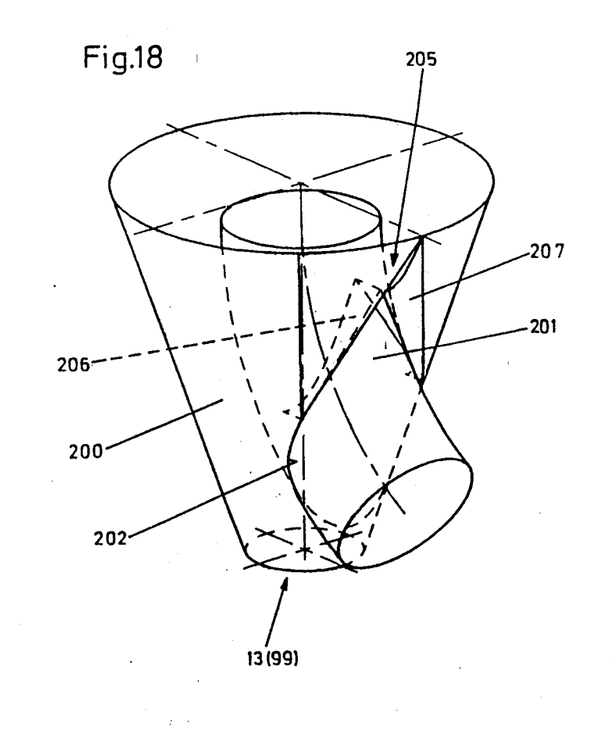
FIG. 18 shows in oblique view the lower section of a separating device according to the invention.
Figure 19:
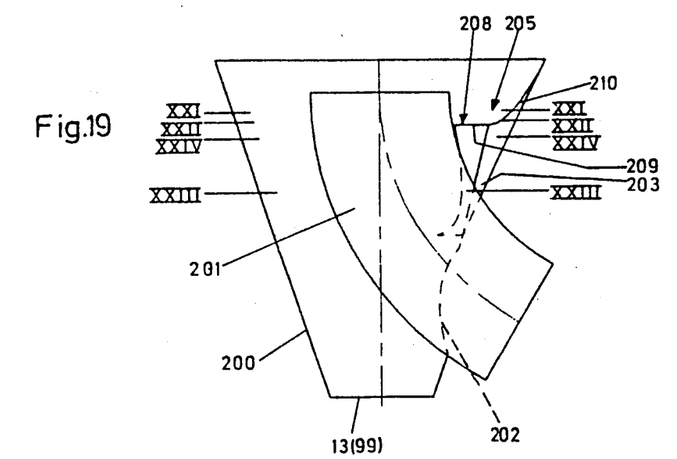
FIG. 19 shows the separating device of FIG. 18 in vertical section.
Figure 20:
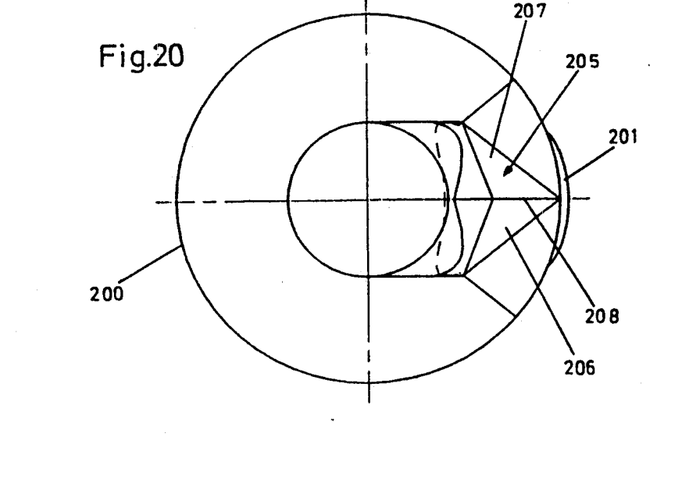
FIG. 20 shows a top view of the part of the separating device shown in FIG. 18, FIGS. 21, 22, 23 and 24 show horizontal sections through the part of the separating device shown in FIG. 18 along lines XXI, XXII, XXIII and XXIV, respectively, of FIG. 19.
Figure 21:
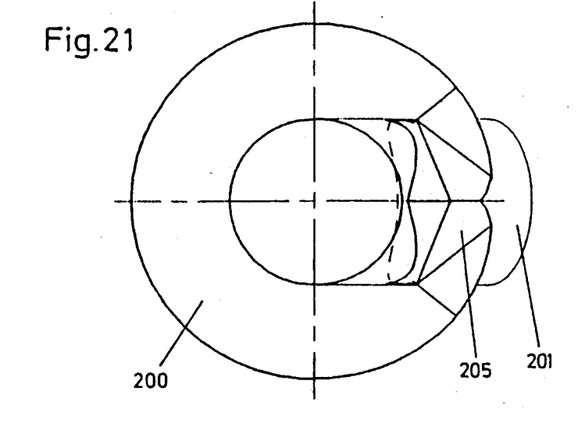
Figure 22:
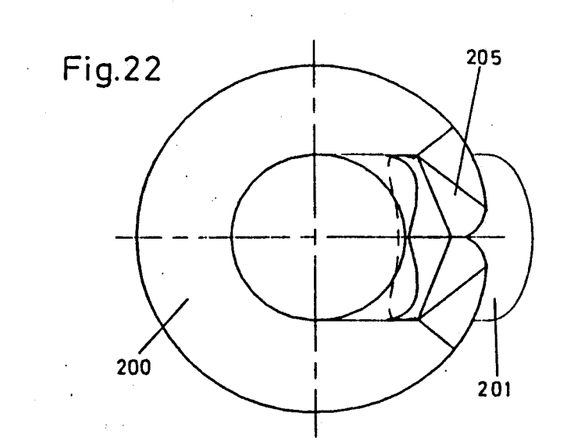
Figure 23:
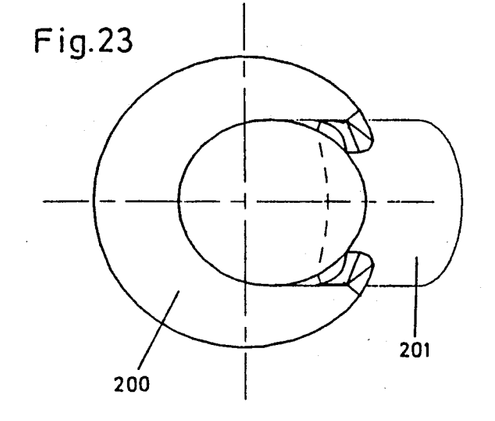
Figure 24:
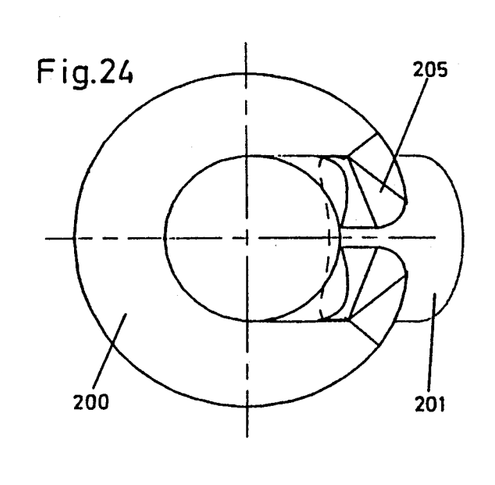

The section of the device according to the invention shown in FIG. 18 is a cone-shaped part 200 of the housing of the device, in which discharge opening 13 or 99 for separated solids, such as dust and the like, is located at the bottom. The lower dip pipe, which is represented also only partially in FIG. 18, is guided outward, with a curved section 201, from cone-shaped part 200. Curved section 201 of the dip pipe passes through an opening 202 in cone-shaped part 200.

A roof-shaped guide device 205 consisting of sheet metal, is provided above gusset 203. Guide device 205 has the task of preventing deposits of dust or the like in gusset 203 between the wall of cone-shaped section 200 and the curved section 201 of the dip pipe.

As shown in the drawings (especially FIG. 25) guide device 205 consists of two sheet metal parts 206 and 207. Ridge 208 of guide device 205 consists of a straight part 209 and a part 210 bent concave, seen from above. Consequently, the two sheet metal blanks 206, 207, forming guide device 205, have a planar surface 212 in the area of straight part 209 of ridge 208, while in the area of bent part 210 of ridge 208 they have a surface 211, concavely curved seen from above.

Figure 25:
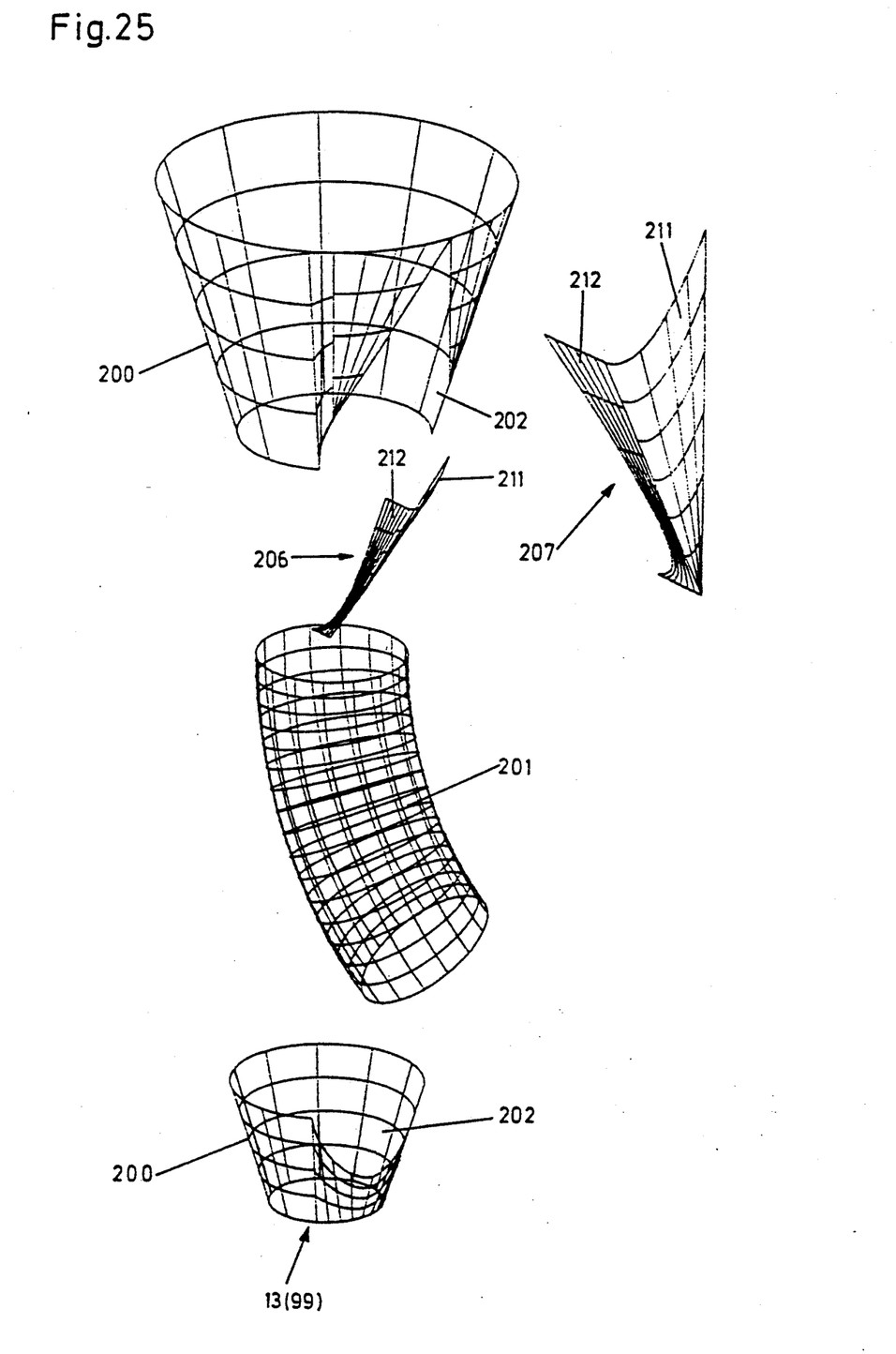
FIG. 25 shows the components of the device of FIG. 18 in an exploded perspective view.

The edges of the sheet metal blanks (sheet metal parts 206, 207) forming guide device 205, are connected to the edges of opening 202 in cone-shaped section 200 of the housing, e.g., welded. The other edges of parts 206 and 207 of guide device 205 rest against the dip pipe, namely, against its curved section 201 and are also connected to it there also, for example, by welding.

What is claimed is:

1. In an apparatus for separating at least one material from a fluid medium by centrifugal force, said material having a different specific gravity from the medium, comprising a housing, means for producing rotation of the mixture of material and medium around an axis parallel to a direction of flow within the housing, a separation chamber, into which the sides of dip pipes (8, 9, 92, 93, 105, 106), coaxial with one another and opposite to one another, project, the separated medium flowing from the separation chamber through a said dip pipe, and a discharge opening (13, 99) for the separated material; the improvement wherein said discharge opening (13, 99) for the separated material is provided on an end of the housing opposite an intake opening for the mixture, a lower of said dip pipes (8, 93, 106) adjacent said discharge opening (13, 99) emerges laterally from said housing, and wherein a guide device (12, 95, 107) of cone shape is disposed adjacent an upper end of said lower dip pipe (8, 93, 106), said guide device being of sheet metal (12, 98, 107), and having the shape of an upwardly tapering jacket of a frustum that is connected by an end of smaller diameter to said lower dip pipe (8, 93, 106) in a fluid-tight manner.

2. In an apparatus for separating at least one material from a fluid medium by centrifugal force, said material having a different specific gravity from the medium, comprising a housing, means for producing rotation of the mixture of material and medium around an axis parallel to a direction of flow within the housing and a separation chamber, into which the sides of dip pipes (28, 29) coaxial with one another and opposite to one another, project, the separated medium flowing from the separation chamber through a said dip pipe, and a discharge opening (33) for the separated material; the improvement wherein said discharge opening (33) for the separated material is provided on an end of the housing opposite an intake opening for the mixture in the apparatus and emerges laterally from said housing, a lower of said dip pipes (28, 78), provided in the area of said discharge opening being straight, and a cone-shaped guide device disposed adjacent an upper end of said lower dip pipe, said guide device being of sheet metal (12, 98, 107), and having the shape of an upwardly tapering jacket of a frustum that is connected by an end of smaller diameter to said lower dip pipe (8, 93, 106) in a fluid-tight manner.

3. Apparatus according to claim 1, wherein said lower dip pipe (8, 93, 106) has a curved section (201), which emerges through a cone-shaped lower area (200) of the housing.

4. Apparatus according to claim 1, wherein a roof-shaped guide member (205), resting on said lower dip pipe (8, 93, 106), is provided in a gusset between a wall (10, 96) of said housing and said lower dip pipe (8, 93, 106).

5. Apparatus according to claim 4, wherein said roof-shaped guide member (205) has a ridge (208) which is at least partially horizontal.

6. Apparatus according to claim 5, wherein said roof-shaped guide member (205) has a ridge (208) which is at least partly concavely curved as seen from above.

7. Apparatus according to claim 6, wherein said ridge (208) has a part (210) sloping from a housing wall (200) toward said lower dip pipe (201).

8. Apparatus according to claim 7, wherein said sloping part is said concavely curved part (210) of said ridge (208) of said guide member (205).

9. Apparatus according to claim 8, wherein said ridge (208) of said guide member (205) has a horizontal part (209) adjacent to said lower dip pipe (201) and said concavely curved section (210) adjacent to said wall of the housing.

10. Apparatus according to claim 4, wherein said roof-shaped guide member (205) consists of two sheet metal parts (206, 207).

11. Apparatus according to claim 10, wherein said sheet metal parts (206, 207) extend between surfaces of a said lower dip pipe (201) and of a housing wall (200) facing one another.

12. Apparatus according to claim 10, wherein said sheet metal parts (206, 207) of said guide member (205) each have at least a planar and a curved area (212, 211).

13. Apparatus according to claim 12, wherein said curved area (211) of said sheet metal parts (206, 207) of said guide member (205) is concavely curved as seen from above.

14. Apparatus according to claim 10, wherein said sheet metal parts (206, 207) forming said guide member (205) have a planar area (212) extending downward from a straight part (209) of a ridge (208) and a curved area (211) extending downward from a bent part (210) of said ridge (208).

* * * * *